United States Patent

[11] 3,626,221

| [72] | Inventors | Gordon R. Anderson;<br>Gordon R. Anderson, Jr., both of Roscoe, Ill. |
|---|---|---|
| [21] | Appl. No. | 71,747 |
| [22] | Filed | Sept. 14, 1970 |
| [45] | Patented | Dec. 7, 1971 |
| [73] | Assignee | Airtrol Corporation<br>Roscoe, Ill. |

[54] ELECTRIC MOTOR WITH PERMANENTLY LUBRICATED BEARINGS
2 Claims, 3 Drawing Figs.

[52] U.S. Cl. .................................................. 310/90, 308/36.1
[51] Int. Cl. ..................................................... H02k 5/16
[50] Field of Search .......................................... 310/90, 67, 162, 163, 164, 172; 308/36.1, 132, 72

[56] References Cited
UNITED STATES PATENTS

| 2,149,983 | 3/1939 | Smith .......................... | 308/72 |
| 3,497,735 | 2/1970 | Diederichs .................... | 310/90 |
| 3,505,547 | 4/1970 | Kaneko ........................ | 310/67 |
| 3,513,339 | 5/1970 | Harris .......................... | 310/90 |
| 3,515,918 | 6/1970 | Otto ............................ | 310/90 |

*Primary Examiner*—D. F. Duggan
*Assistant Examiner*—R. Skudy
*Attorney*—Wolfe, Hubbard, Leydig, Voit & Osann ABSTRACT: The rotor of a shaded-pole motor includes a central sleeve supported on a stationary shaft by axially spaced inner and outer bearings which are lubricated by an oil impregnated tubular liner telescoped into the sleeve and sandwiched between the two bearings. An oil storage ring disposed in contact with the outboard face of the inner bearing includes angularly spaced fingers which engage the shaft to prevent oil from leaking out of the sleeve and along the shaft. An additional ring is disposed in contact with the outboard face of the outer bearing to return oil to such bearing.

PATENTED DEC 7 1971 3,626,221
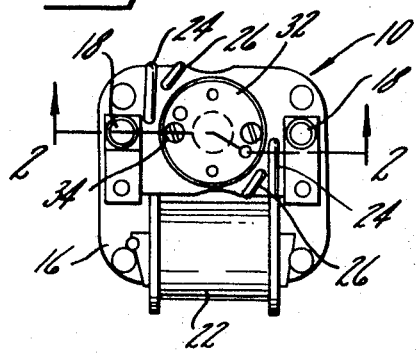
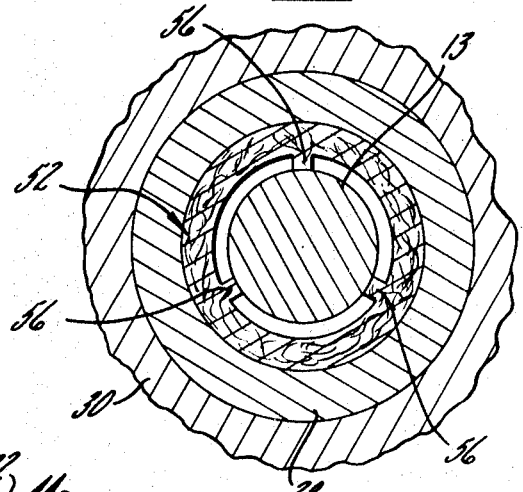
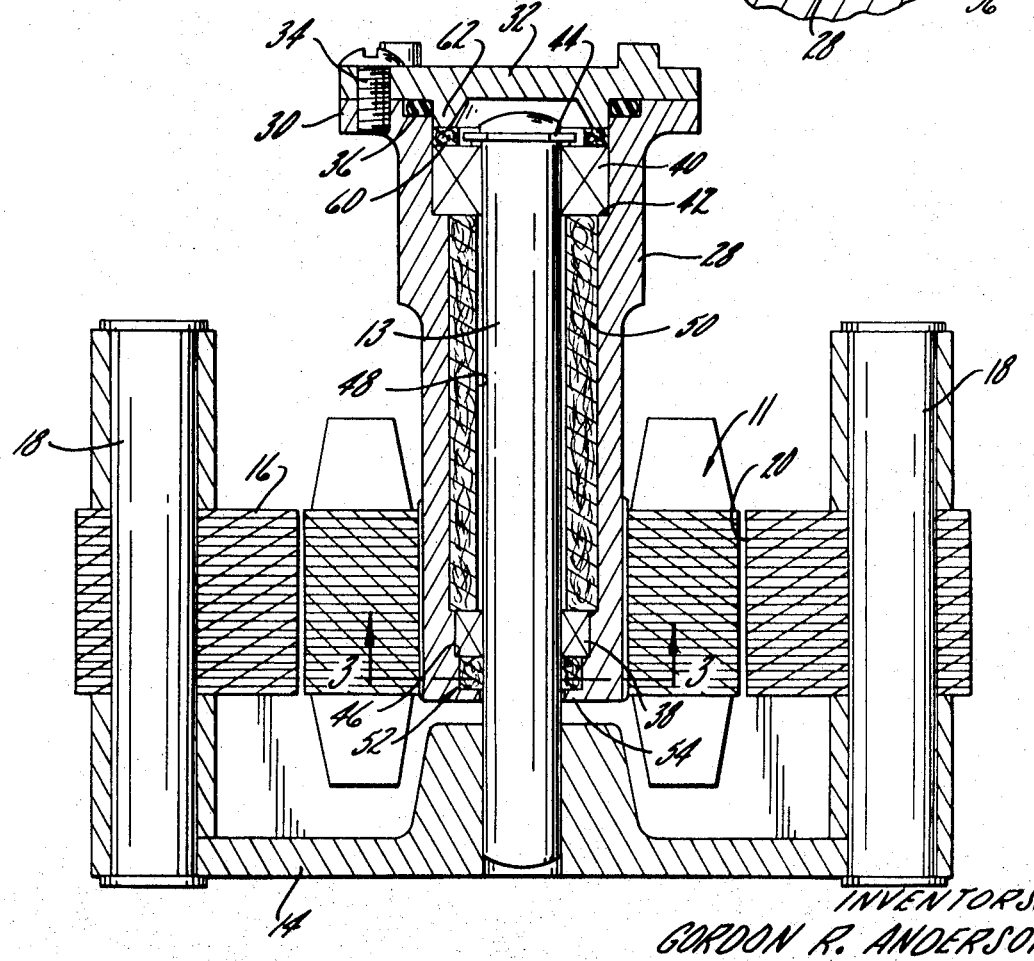
INVENTORS.
GORDON R. ANDERSON
GORDON R. ANDERSON JR.
BY Wolf, Hubbard, Leydig, Voit & Osann
ATTORNEYS.

16
3,626,221

ELECTRIC MOTOR WITH PERMANENTLY LUBRICATED BEARINGS

BACKGROUND OF THE INVENTION

This invention relates to an electric motor and, more particularly, to an electric motor of the type having a pair of axially spaced shaft bearings which are telescoped into a sleeve carried by a rotor and which rotate on a stationary shaft projecting cantilever fashion from a stator assembly. The bearings are made of porous material and are adapted to be permanently lubricated by an oil impregnated liner telescoped into the sleeve and over the shaft and sandwiched between the opposing inboard faces of the bearings. A motor of this general type is disclosed in Lautner U. S. Pat. No. 2,904,709.

SUMMARY OF THE INVENTION

The general aim of the present invention is to provide a new and improved permanently lubricated motor which, as compared to prior motors of the same general character, is simpler and less expensive in construction, is more effectively sealed to protect against oil leaking along the shaft and out of the sleeve and, at the same time, effects a more positive return to both bearings of any oil which may flow past the bearings along the shaft.

In a more detailed sense, the invention resides in the novel provision of oil storage rings in contact with the outboard faces of the bearings, the inner ring being effective to seal and wipe against the shaft and to return to the adjacent bearing any oil tending to bleed inwardly along the shaft.

Other objects and advantages of the invention will become apparent from the following detailed description taken in connection with the accompanying drawings.

BRIEF DESCRIPTION OF THE DRAWINGS

FIG. 1 is a front elevation of a new and improved electric motor incorporating the novel features of the present invention.

FIG. 2 is an enlarged cross section taken substantially along the line 2—2 of FIG. 1.

FIG. 3 is an enlarged fragmentary cross section taken along the line 3—3 of FIG. 2.

DETAILED DESCRIPTION OF THE PREFERRED EMBODIMENT

As shown in the drawings for purposes of illustration, the invention is embodied in a shaded-pole motor 10 generally comprising a cylindrical rotor 11 journaled for rotation on a cantilevered shaft 13 rigid with and projecting outwardly from the frame bracket 14 of a stator assembly. The frame bracket supports a field core 16 which is formed by sets of stacked laminations secured to the bracket by rivets 18 and defines a cylindrical opening 20 within which the rotor is disposed. Wrapped around a portion of the stator is a primary winding 22 adapted for connection to a source of alternating current voltage, and placed in selected positions in the stator are the usual shading coils 24 and 26.

The rotor 11 includes a central tubular sleeve 28 (FIG. 2) machined from nonmagnetic material and press-fitted into a series of stacked sheet metal stampings which coact with a plurality of conductors (not shown) to form the secondary winding of the motor. The sleeve 28 also may be formed as an integral part of the secondary winding of the motor. The outer end of the sleeve 28 is formed with an annular flange 30 to which a nylon end cap 32 is fastened by screws 34 and sealed by an O-ring 36, the flange and the end cap being adapted for connection to a device such as a fan blade (not shown) which is to be driven by the motor.

As shown in FIG. 2, the sleeve 28 is telescoped onto the shaft 13 and is supported thereon by inner and outer axially spaced bearings 38 and 40 which are press-fitted into the sleeve and received rotatably on the shaft with a running fit so that the rotor 11 thus can turn freely on the shaft. The outer bearing 40 is captivated between an annular shoulder 42 within the sleeve 28 and a snapring 44 on the shaft while the inner bearing 38 seats against an annular shoulder 46 formed within the inner end portion of the sleeve.

Formed between the bearings 38 and 40 is a chamber 48 (FIG. 2) adapted to hold a quantity of oil for lubricating the bearings during the entire service life of the motor. A tubular liner 50 of felt or other absorbent material for conducting oil to the bearings is disposed within the chamber with its ends contacting the inboard faces of the bearings. The liner is pressed into the sleeve 28 and is telescoped loosely over the shaft 13 so as to leave the rotor 11 free to turn without being retarded as a result of frictional contact of the liner with the shaft. The bearings are made of sintered metal and are somewhat porous so that oil delivered to the bearings by the liner may work its way through the bearings to lubricate the shaft between the latter and the bearings and thus reduce wear and running friction.

In accordance with the primary aspect of the present invention, a novel oil storage ring 52 (FIGS. 2 and 3) is captivated adjacent the outboard face of the inner bearing 38 to seal against the inward leakage of oil along the shaft 13 when the motor 10 is idle and to wipe oil from the shaft when the motor is running. The ring is made of absorbent material and is capable of returning the oil from the shaft back to the bearing simply by virtue of the contact of the ring with the bearing.

In the present instance, the storage ring 52 is made of felt and is pressed into the sleeve 28 and telescoped over the shaft 13 in direct contact with the outboard face of the inner bearing 38. An annular flange 54 (FIG. 2) extending around the inner end of the sleeve prevents inward axial movement of the ring relative to the sleeve. The inner periphery of the ring is for the most part spaced radially outwardly from the shaft to avoid frictional contact with the latter but, in furtherance of the invention, is formed with three angularly spaced and radially projecting fingers 56 (FIG. 3) which engage and lightly wipe against the shaft.

When the motor 10 is idle, the fingers 56 soak up any oil which tends to bleed along the shaft 13 and past the inner bearing 38. During turning of the rotor 11, the fingers successively wipe against the shaft and pick up any oil which seeps past the inner bearing and which otherwise would leak from the inner end of the sleeve 28. The oil picked up by the fingers is absorbed by the ring 52 and is returned to the bearing. Thus, the ring 52 with the fingers 56 restricts the leakage of oil along the shaft 13, soaks up any oil passing through the bearing 38 itself and, in addition, coacts with the liner 50 to provide oil storage felts on both sides of the bearing in contact with substantial surface areas thereof to effect a positive return of oil to both sides of the bearing without need of forming return grooves in either the bearing or the sleeve. Because only the fingers touch the shaft, excessive frictional contact is avoided and yet, as the motor warms up, the fingers and the ring enable the sleeve to breath or expand without forcing oil out of the inner end of the sleeve.

Advantageously, a second oil storage ring 60 (FIG. 2) is disposed in contact with the outboard face of the outer bearing 40, the ring 60 also being made of felt and being captivated between the outer bearing and an annular rib 62 formed on the inner face of the end cap 32. The ring 60 soaks up oil seeping past the bearing 40 and into the cavity between the bearing and the end cap and serves to provide a positive return of the oil back to the bearing. Since the ring 60 need not seal against the shaft 13, its inner periphery is simply circular and is spaced radially outwardly from the shaft.

We claim as our invention:

1. An electric motor having a stator assembly and an outwardly projecting stationary shaft extending cantilever fashion from part of said stator assembly, a rotor having a centrally located cylindrical sleeve telescoped over said shaft, axially spaced bearings of porous material fixed within said sleeve and rotatable on said shaft, and a tubular liner impregnated with oil telescoped into said sleeve and over said shaft and sandwiched between the opposing inboard faces of said bearings, the improvement in said motor comprising, oil retaining rings of absorbent material telescoped into said sleeve and over said shaft and captivated in contact with the outboard faces of said bearings, the inner periphery of the inner one of said rings being formed with angularly spaced and inwardly projecting fingers whose inner ends contact and wipe against said shaft to soak up any oil bleeding along the shaft and to return such oil to the adjacent bearing.

2. An electric motor having a stator assembly and an outwardly projecting stationary shaft extending cantilever fashion from part of said stator assembly, a rotor having a centrally located cylindrical sleeve telescoped over said shaft, axially spaced bearings of porous material fixed within said sleeve and rotatable on said shaft, and a tubular liner impregnated with oil telescoped into said sleeve and over said shaft and sandwiched between the opposing inboard faces of said bearings, the improvement in said motor comprising, an oil retaining ring of absorbent material telescoped into said sleeve and over said shaft and captivated in contact with the outboard face of the inner one of said bearings, the inner periphery of said ring being formed with angularly spaced and inwardly projecting fingers whose inner ends contact and wipe against said shaft to soak up any oil bleeding along the shaft and to return such oil to the inner bearing.

* * * * *